United States Patent
Nakanishi

(10) Patent No.: US 7,820,316 B2
(45) Date of Patent: Oct. 26, 2010

(54) MEMBRANE ELECTRODE ASSEMBLY AND FUEL CELL

(75) Inventor: Haruyuki Nakanishi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 232 days.

(21) Appl. No.: 11/584,638

(22) Filed: Oct. 23, 2006

(65) Prior Publication Data

US 2008/0096094 A1  Apr. 24, 2008

(51) Int. Cl.
*H01M 8/14* (2006.01)

(52) U.S. Cl. .............................. 429/44; 429/40; 429/42

(58) Field of Classification Search .................... 429/40, 429/44, 42, 30
See application file for complete search history.

(56) References Cited

U.S. PATENT DOCUMENTS

| | | | | |
|---|---|---|---|---|
| 6,180,275 | B1 * | 1/2001 | Braun et al. | 429/34 |
| 2004/0224217 | A1 * | 11/2004 | Toops | 429/44 |
| 2006/0172179 | A1 * | 8/2006 | Gu et al. | 429/44 |
| 2006/0269827 | A1 * | 11/2006 | Liu et al. | 429/44 |

FOREIGN PATENT DOCUMENTS

| | | |
|---|---|---|
| JP | 63-236778 A | 10/1988 |
| JP | A 8-17440 | 1/1996 |
| JP | 2000-003714 A | 1/2000 |
| JP | A 2001-6699 | 1/2001 |
| JP | A 2002-110176 | 4/2002 |
| JP | A 2002-246034 | 8/2002 |
| JP | 2003-115302 A | 4/2003 |
| JP | A 2005-4967 | 1/2005 |
| WO | WO 99/65821 A1 | 12/1999 |

OTHER PUBLICATIONS

Nobuyuki Kamiya, "Developmnet and Application of Solid Polymer Type Fuel Cells," N.T.S. Inc., pp. 6-8, Apr. 28, 2000.

* cited by examiner

*Primary Examiner*—Patrick Ryan
*Assistant Examiner*—Ben Lewis
(74) *Attorney, Agent, or Firm*—Oliff & Berridge, PLC

(57) ABSTRACT

A membrane electrode assembly includes a fluorine-based ion exchange resin membrane, a diffusion layer and a catalyst layer that supports a battery reaction. The catalyst layer is formed from Pt-carrying carbon nanotubes that is oriented on the fluorine-based ion exchange resin membrane, and non-Pt-carrying carbon nanotubes that is oriented on the diffusion layer.

17 Claims, 4 Drawing Sheets

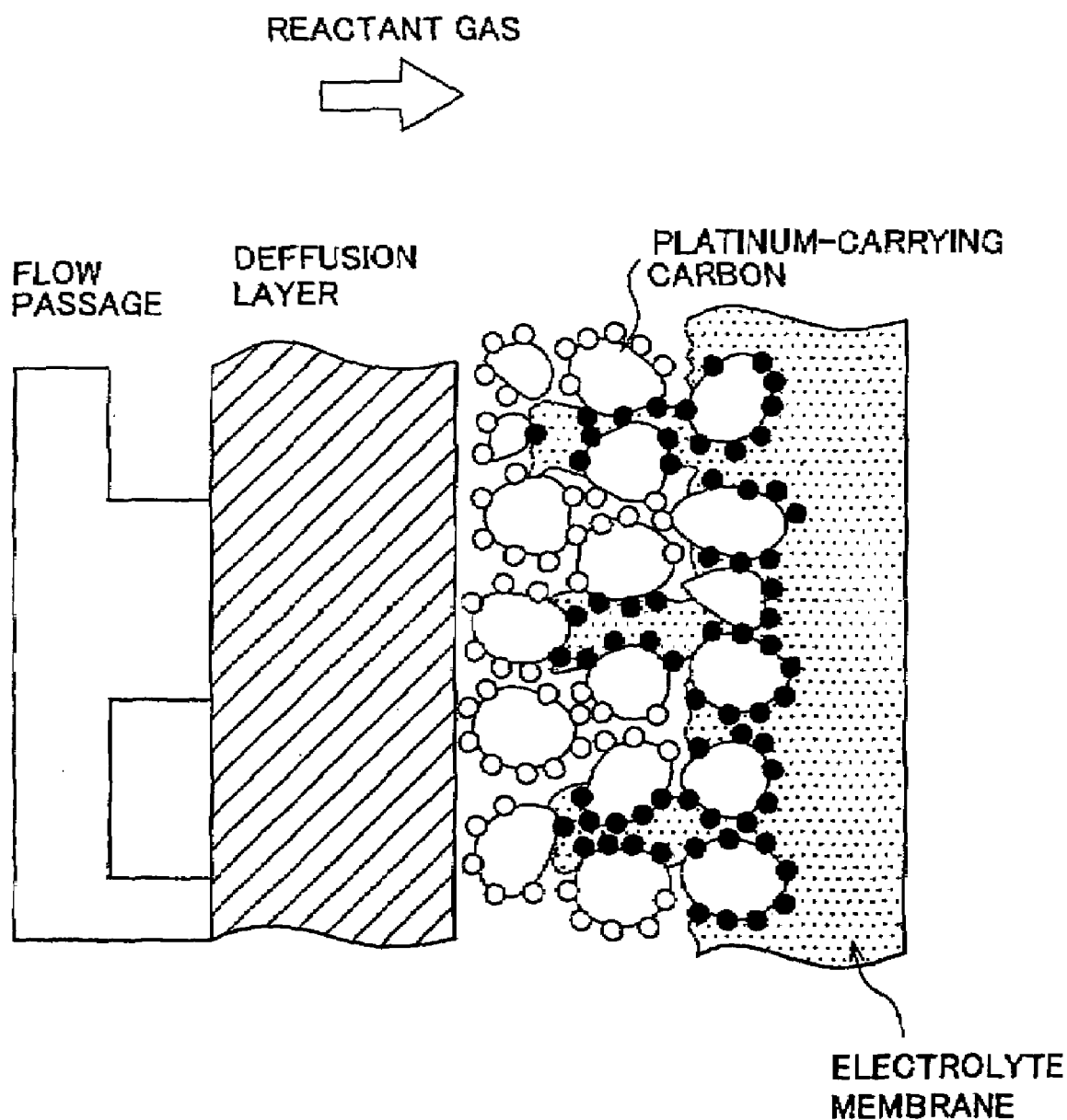

MEMBRANE ELECTRODE ASSEMBLY AND FUEL CELL

INCORPORATION BY REFERENCE

The disclosure of Japanese Patent Application No. 2004-111856 filed on Apr. 6, 2004 including the specification, drawings, and abstract is incorporated herein by reference in its entirety.

BACKGROUND OF THE INVENTION

1. Field of the Invention

The present invention relates to a membrane electrode assembly applied to an electricity generating cell of a fuel cell using a polymer electrolyte membrane, and to a fuel cell using same.

2. Description of the Related Art

In recent years, fuel cells that generate electricity by electrochemical reactions between hydrogen and oxygen have become the subject of interest as an energy supply source. In a fuel cell, for example, using an ion exchange resin membrane, the configuration is generally one in which the ion exchange resin membrane made of a polymer electrolyte is sandwiched between an anode electrode and a cathode electrode. Each of these electrodes is constructed so as to be provided with a catalyst layer that supports an electrochemical reaction and a diffusion layer that functions as an electrical collector.

The catalyst layer is generally formed by dispersing carbon (C) powder that carries a catalyst metal such as platinum (Pt) based metal or the like for the electrode reaction, into an appropriate organic solvent, and forming this into a paste by adding to this an electrolyte solvent, and then providing this on an ion exchange resin membrane, which is a proton-conductive substance. In this fuel cell electrode, therefore, the structure is a gas diffusion type which is based mainly on carbon black, and in which a catalyst metal that supports the electrode reaction and a proton-conductive substance and the like are hardened thereonto. (For example, refer to the non-patent publication, "Development and Application of Solid Polymer Type Fuel Cells" NTS, Inc., page 6).

The electrode reaction occurs at the part at which the electrode and the proton-conductive substance make contact. That is, the reaction occurs with the supply of the reactant gas to the three phase boundary, and because, as shown in FIG. 4, the design of the three phase boundary is extremely difficult art, in the conventional art there was the problem of the insufficient supply of reactant gas to reach the three phase boundary, and a lack of effective utilization of the costly Noble metal catalyst supported in the region of the three phase boundary. For this reason, even if an attempt is made to reduce the amount of Noble metal that is used, this leads to a decrease in the current supply, and it is difficult to reduce the amount of use of the Noble metal without sacrificing electrical generation efficiency. The white circles in FIG. 4 indicate platinum particles which are effective in the reaction, and the black circles in FIG. 4 indicate platinum particles which are not effectively operating in the reaction.

A diffusion layer is generally provided at the above-noted electrode, in which case a diffusion layer is provided between a separator for the purpose of forming a flow passage for the supply and removal of fuel and the catalyst layer, so that the structure is a laminate of separator/diffusion layer/catalyst layer/polymer electrolyte membrane. Because it is particularly necessary to prevent a worsening of the contact resistance between the diffusion layer and catalyst layer and between the separator and the diffusion layer from reducing the electrical generation efficiency, it is essential that surface pressure be applied by tightening with bolts or the like, and there has been the problem of a worsening of membrane durability. Particularly serious problems have been that of reducing the electrical contact resistance between the diffusion layer and catalyst layer and that of improving the diffusion of fuel and the like, that is, of achieving conductivity (for example, refer to Japanese Patent Application Publication No. JP-A-2002-246034).

A reducing of the contact resistance between the catalyst layer and the gas diffusion layer is described in, for example, the Japanese Patent Application Publication JP-A-2001-6699. However, because the constitution is one in which a layer of only carbon particles is provided as a diffusion layer on the catalyst electrode, although there is a small reduction in the internal resistance, the gas diffusion is not improved, and this is insufficient from the standpoint of improving the electrical generation efficiency.

Further, an electrode catalyst using a fibrous carbon as a carrier is described in, for example, the Japanese Patent Application Publication No. JP-A-8-17440. However, with a constitution in which the carbon is merely made fibrous, this is similar to the above-noted related art in that the electrical generation efficiency is insufficient, and in that a detrimental effect on the membrane durability is not avoided.

As described above, although reducing the internal resistance in a fuel cell is effective in increasing the electrical generation efficiency of the fuel cell, the effectiveness of merely adding a diffusion layer using carbon paper or the like in improving the contact resistance is poor. Also, related art has not been established for effectively utilizing, in the electrode reaction, the Noble metal catalyst, which is carried in the region of the three phase boundary that is at a distance from the supply side of the fuel and oxidant gas. That is, the current situation with related art is that it is not yet possible to provide a membrane electrode assembly capable of achieving good electrical generation efficiency without applying high surface pressure by tightening, which adversely affects the membrane.

SUMMARY OF THE INVENTION

It is an object of the present invention to provide a membrane electrode assembly enabling electrical generation operation with high durability and high electrical current density, by allowing an electrode reaction to make effective use of a supported high-cost Noble metal catalyst and without applying high surface pressure by tightening. Another object of the present invention is to provide a fuel cell having the above-noted membrane electrode assembly, which achieves high electrical generation efficiency (electrical generation with a high current density) with high durability.

A first aspect of the present invention relates to a membrane electrode assembly having a polymer electrolyte membrane in which a plurality of first electrically conductive fibers is oriented, and a diffusion layer in which a plurality of second electrically conductive fibers is oriented, and in which the second electrically conductive fibers are cause to come into contact with the first electrically conductive fibers, wherein at least one of the first electrically conductive fibers and the second electrically conductive fibers supports an electrode catalyst metal.

Specifically, the electrically conductive fibers that support the electrode catalyst metal form the electrode of a membrane electrode assembly, and function as a catalyst reaction part (catalyst layer) that supports the electrode reaction when fuel and oxidant gas are supplied. For example, when configuring a solid polymer fuel cell (PEFC), the electrically conductive fiber that carries the electrode catalyst metal is positioned between the polymer electrolyte membrane and the diffusion layer, so as to form a laminated structure of separator/diffusion layer/electrically conductive fibers (catalyst layer)/polymer electrolyte membrane.

In this membrane electrode assembly, the first electrically conductive fibers that are oriented on the polymer electrolyte membrane side and the second electrically conductive fibers that are oriented on the diffusion layer side are caused to mutually contact one another. For example, one of the first electrically conductive fibers on the polymer electrode membrane side and second electrically conductive fibers on the diffusion layer side is interposed among the other electrically conductive fibers so as to make contact therewith, thereby forming a laminated structure of diffusion layer/catalyst layer/polymer electrolyte membrane in which strongly mutually intertwined electrically conductive fibers form the catalyst layer. The result is that the electrical resistance in the lamination direction (thickness direction) between the diffusion layer/catalyst layer/polymer electrolyte membrane is dramatically reduced, thereby enabling an improvement in the electrical conduction efficiency. For this reason, it is not necessary to apply high surface pressure using bolt tightening, which was essential in the past to achieve electrical generation performance (electrical conductivity), thereby eliminating the decrease in membrane durability accompanying the tightening, and enabling the achievement of good electrical generation performance (electrical generation operation at a high current density) and good durability.

A second aspect of the present invention relates to a fuel cell having the membrane electrode assembly of the first aspect and a separator in which a flow path is formed by a convex groove provided between a non-oriented region of the second electrically conductive fibers (for example, the layer surface on the side of the diffusion layer that is opposite from the side on which the second electrically conductive fibers are oriented) of the diffusion layer. By providing a membrane electrode assembly having this constitution, electrical generation operation is possible with high durability and at a high currently density.

According to the present invention, a membrane electrode assembly is provided that enables electrical generation operation with high durability and at a high current density, both with effective use made of the supported high-cost Noble metal catalyst for an electrode reaction and without applying a high surface pressure by tightening. The present invention also provides a fuel cell having this membrane electrode assembly, which achieves good electrical generation performance (electrical generation operation at a high current density) with high durability.

BRIEF DESCRIPTIONS OF THE DRAWINGS

The foregoing and/or further objects, features, and advantages of the present invention will become more apparent from the following description of preferred embodiments, with reference to the accompanying drawings, in which like numerals are used to represent like elements, and wherein:

FIG. 4 is a simplified cross-sectional view for describing the structure of a fuel cell according to the prior art.

DETAILED DESCRIPTION OF THE PREFERRED EMBODIMENTS

An embodiment of a fuel cell according to the present invention is described in detail below, with references made to the accompanying drawings, and the embodiment of a membrane electrode assembly according to the present invention will also be described in detail as part of that description. In the embodiment described below, the description is mainly with respect to a solid polymer fuel cell (PEFC) using hydrogen gas and air (oxygen) as fuel for electrical generation operation. It will be understood, however, that the present invention is not restricted to the embodiments described below.

An embodiment of a membrane electrode assembly and a fuel cell according to the present invention is described below with references made to FIG. 1 to FIG. 3. This embodiment uses single-layer carbon nanotubes 31, 35 (hereinafter single-layer carbon nanotube are sometimes abbreviated as CNT) as the electrically conductive fibers. The linear Pt-carrying CNT 31 that carries platinum (Pt; electrode catalyst metal) is supported on an outer wall of the CNT, and is oriented substantially perpendicularly to the surface of the fluorine-based ion exchange resin membrane on the fluorine-based ion exchange resin (polymer electrolyte) membrane 11 side. The linear non-Pt-carrying CNT 35, which is oriented substantially perpendicularly to the surface of the diffusion layer 17, is provided on the surface of the diffusion layer 17 side. One of the Pt-carrying CNT 31 and non-Pt-carrying CNT 35 is interposed between and makes contact with the other.

Figure 1:
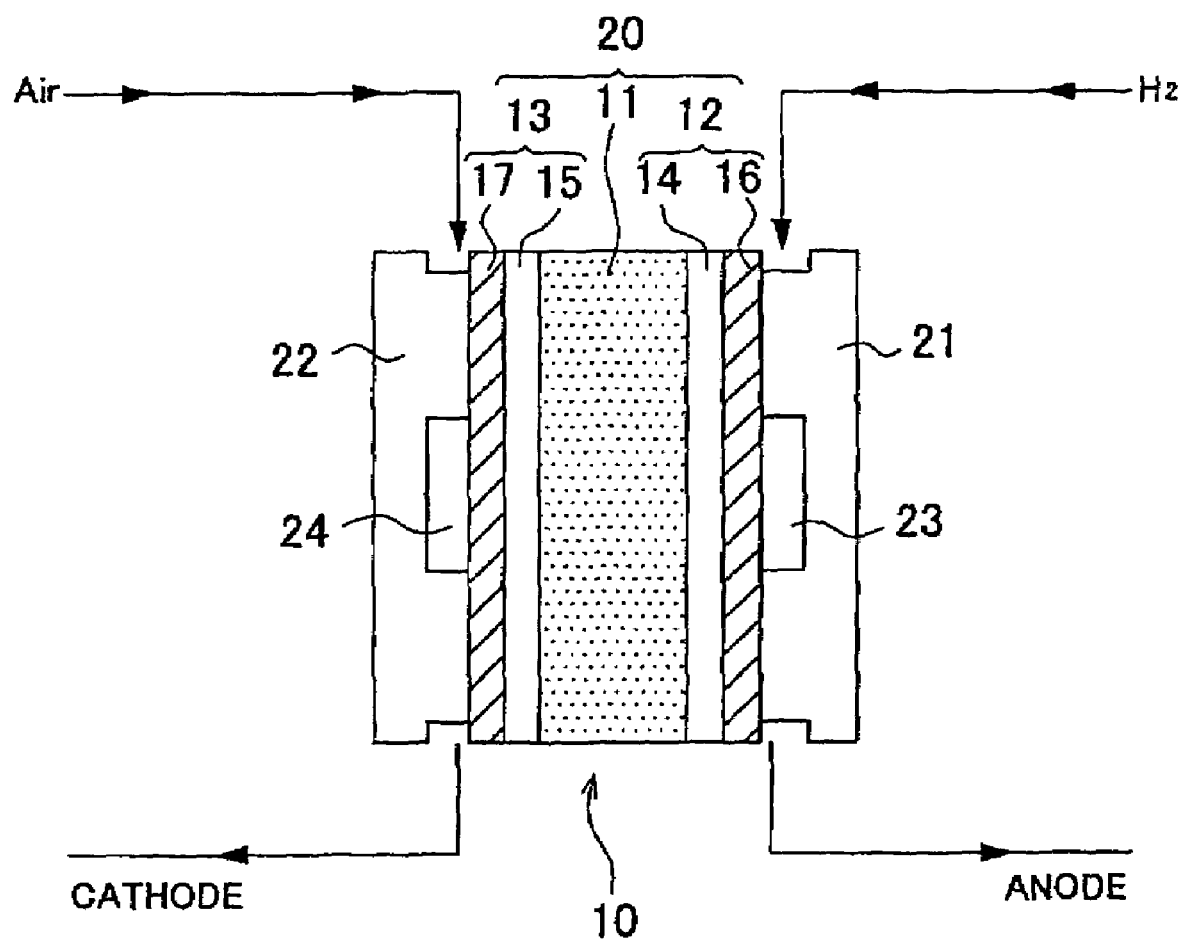
FIG. 1 is a simplified cross-sectional view showing a fuel cell according to an embodiment of the present invention.

As shown in FIG. 1, the fuel cell (single cell) 10 of this embodiment is formed by a membrane electrode assembly 20 and a pair of separators 21, 22 between which the membrane electrode assembly 20 is sandwiched. The separator 21 is provided with a hydrogen gas flow passage 23, through which hydrogen passes to the fuel electrode (anode electrode) 12 side, that is, through which the hydrogen gas is supplied and exhausted. The separator 22 is provide with an air flow passage 24, through which the air passes to the oxidant electrode (cathode electrode) 13 side, that is, through which air is supplied and exhausted. The single cell configured as shown in FIG. 1 can be used in configuring a stack structure in which a plurality of laminations are separated by interposing separators.

In the fuel cell 10, hydrogen gas having a high concentration of hydrogen ($H_2$) is supplied to the hydrogen gas flow passage 23, and air containing oxygen ($O_2$) is supplied to the air flow passage 24, and it is possible to output electrical power by the electrochemical reactions (battery reactions) represented by the following Equation (1) to Equation (3). Equation (1) and Equation (2) indicate reactions occurring at the anode side and cathode side, and Equation (3) indicates the overall reaction in the fuel cell.

$$H_2 \rightarrow 2H^+ + 2e^- \qquad \text{Equation (1)}$$

$$(\tfrac{1}{2})O_2 + 2H^+ + 2e^- \rightarrow H_2O \qquad \text{Equation (2)}$$

$$H_2 + (\tfrac{1}{2})O_2 \rightarrow H_2O \qquad \text{Equation (3)}$$

The membrane electrode assembly 20 has a laminated structure having the fluorine-based ion exchange resin membrane 11, and having anode electrode 12 and cathode electrode 13 (collectively called the "CNT electrodes"), which are provided so as to sandwich the fluorine-based ion exchange resin membrane 11. The anode electrode 12 and the cathode electrode 13, respectively, are formed by the CNT catalyst layers 14, 15 that support the battery reaction and by the diffusion layers 16, 17 that function as electrical collectors. The cathode electrode side is mainly described in further detail below, with references made to FIG. 2, which is a simplified expanded view showing the cathode electrode side of the membrane electrode assembly 20.

Figure 2:
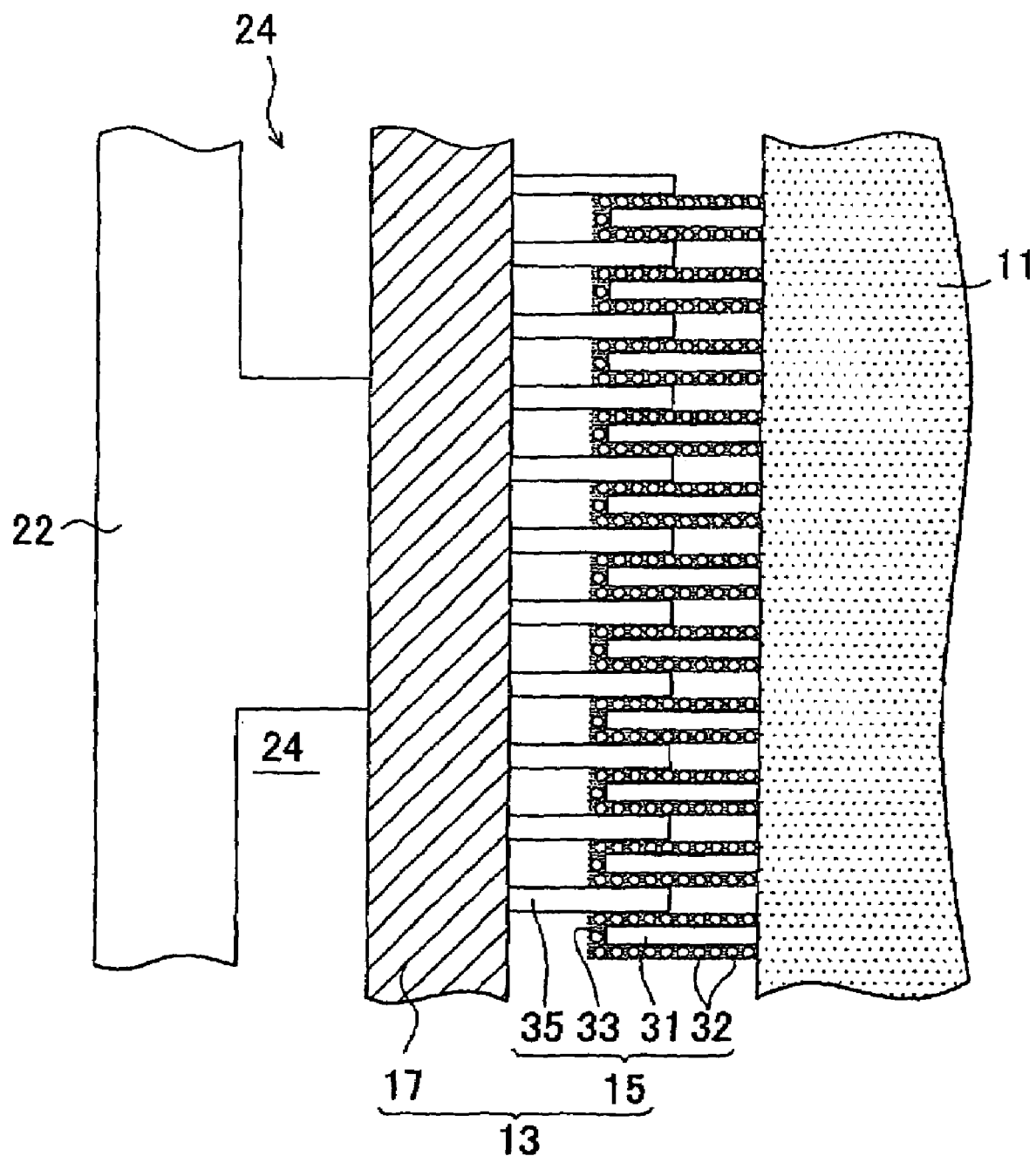
FIG. 2 is a simplified cross-sectional view showing an expanded view of the cathode electrode side of a membrane electrode assembly according to an embodiment of the present invention.

As shown in FIG. 2, the fluorine-based ion exchange resin membrane 11 has linear carbon nanotubes 31 having an outer diameter of 10 nm on one end thereof, and having a length of 500 μm, oriented substantially perpendicularly to the surface of the fluorine-based ion exchange resin membrane 11 that faces the diffusion layer 17, these carbon nanotubes 31 being formed over the entire surface of the fluorine-based ion exchange resin membrane 11 that faces the diffusion layer 17.

Each of the carbon nanotubes 31 provided on the fluorine-based ion exchange resin membrane 11 carries on its outer wall surface platinum (Pt) 32 having a particle diameter of 3 nm as an electrode catalyst metal that supports the battery reaction. By using the linear carbon nanotubes 31 as carriers, in addition to achieving a large surface area and high-density carrying, there is no decrease in drainage even in an environment in which an excess amount of water is produced during electrical generation, supply and diffusion of gas supplied to the three phase boundary is maintained, and the carried Pt 32 contributes effectively to the battery reaction, an electrical generation efficiency that is commensurate with the amount carried being obtained, and there is no great decrease in voltage (concentration overvoltage). In addition to providing the electrode catalyst metal on only the outer wall surfaces of the carbon nanotubes 31, it is possible to provide the electrode catalyst metal on the inner wall surfaces as well, so that carrying is done on both the outer wall surfaces and inner wall surfaces.

The particle diameter of the Pt (electrode catalyst metal) 32 is selected as a size that is no greater than the outer diameter of the carbon nanotubes 31, and with the exception of the above-noted particle diameter, the diameter may be made in the range of approximately 1 to 3 nm. In addition to Pt, an alloy of Pt and another metal may be used in as the electrode catalyst metal.

Figure 3:
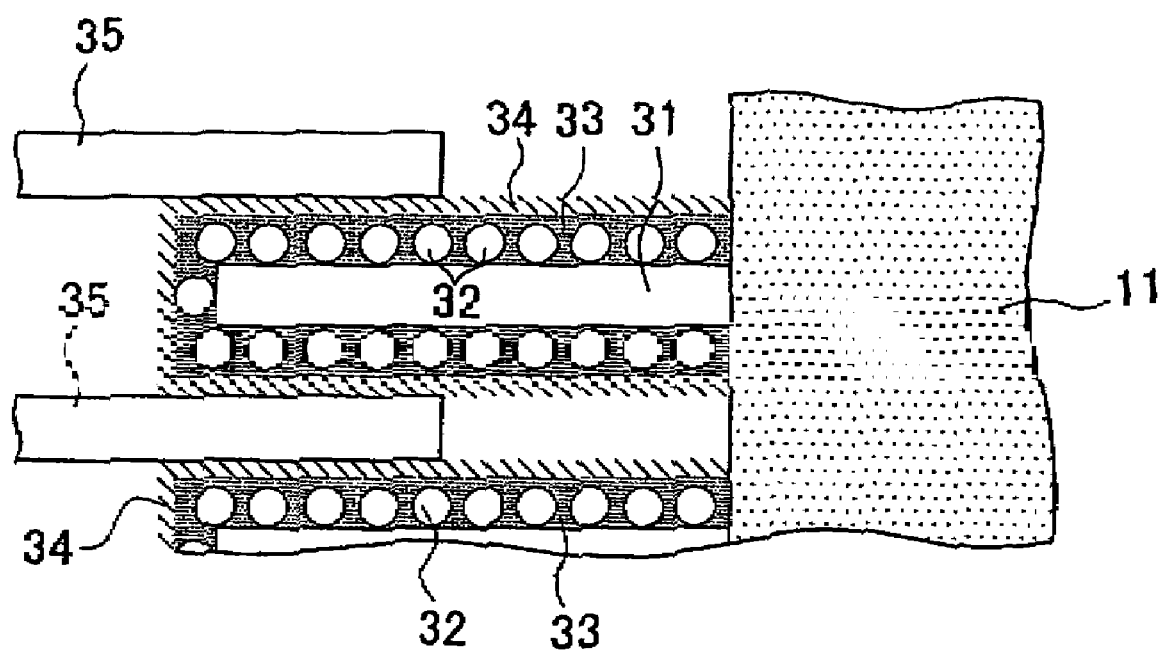
FIG. 3 is a simplified cross-sectional view showing an expanded view of a CNT (carbon nanotube) catalyst layer.

A Nafion solution (Aldrich Chemical; proton-conductive substance) is further applied to the outer surfaces of the carbon nanotubes 31 that carry the Pt 32, as shown in FIG. 3, a Nafion layer 33 having a membrane thickness of 10 to 100 nm being provided, so that proton conductivity in the battery reaction and joining strength with the fluorine-based ion exchange resin membrane fluorine-based ion exchange resin membrane 11 are achieved.

In addition to a Nafion solution, a perfluorosulfonate-based chemical compound (such as a perfluorosulfonate polymer or the like) may be used as the proton-conductive substance. The thickness of the proton-conductive substance (in this case, the Nafion layer 33), in addition to the above-noted thickness, may also be made in the range from 10 to 70 nm, and it is more effective that it particularly be in the range from 10 to 30 nm.

A PTFE layer 34 made of polytetrafluoroethylene (water repellent; PTFE) is further provided on the Nafion layer 33 on the carbon nanotubes 31, as shown in FIG. 3, so that it is possible to achieve draining of product water that is produced accompanying the battery reaction. At least one type of fluorine-base resin may be selected as the water repellent, and alternatively vinylidene polyfluoride (PVDF) may be used other than the above-noted polytetrafluoroethylene. Combined use of a plurality of types is also possible.

In the diffusion layer 17, as shown in FIG. 2, on the side that faces the fluorine-based ion exchange resin membrane fluorine-based ion exchange resin membrane 11, one end of linear carbon nanotubes 35 having a length of 10 μm and an outer diameter 10 nm are joined and oriented substantially perpendicularly to the surface of the diffusion layer 17, these carbon nanotubes 35 being formed over the entire surface on the side of the diffusion layer 17 that faces the fluorine-based ion exchange resin membrane 11.

Carbon nanotubes 35 provided on the diffusion layer 17, similar to the carbon nanotubes 31, may be configured so as to support an electrode catalyst metal (for example, Pt) on the outer wall surface and/or the inner wall surface thereof. In the case of adopting a configuration in which the electrode catalyst metal is supported on the outer wall surface and/or the inner wall surface of the carbon nanotubes 31 and the carbon nanotubes 35, the battery reaction becomes more active and it is possible to achieve electrical generation operation with a higher current density. Also, it is possible to apply a proton-conductive substance such as a Nafion solution or the like on the outer wall surface of the carbon nanotubes 35 either in addition to or instead of supporting the electrode catalyst metal, and it is possible to further apply a water repellent over the proton-conductive substance.

The fluorine-based ion exchange resin membrane 11 and the diffusion layer 17 are each configured so that the carbon nanotubes 31, 35 are oriented so as to be mutually opposite, carbon nanotubes 31 being interposed between the gaps of tube groups of carbon nanotubes 35, and carbon nanotubes 35 being interposed between the gaps of tube groups of carbon nanotubes 31, respectively, with both carbon nanotubes being in mutual contact, via the Pt 32, the Nafion layer 33, and the PTFE layer 34, so as to form the CNT catalyst layer 15.

In this manner, one of the carbon nanotubes that form the CNT catalyst layer 15 and the other carbon nanotubes are joined to and oriented with respect to the fluorine-based ion exchange resin membrane 11 and the diffusion layer 17, respectively and conductivity is maintained. Also, of the carbon nanotubes 31 and carbon nanotubes 35 are in a structure in which one is interposed between and intertwined with the other, so as to maintain conductivity, thereby achieving electrical conductivity in the diffusion layer 17/CNT catalyst layer 15/fluorine-based ion exchange resin membrane 11. It is therefore possible to achieve sufficient electrical conductivity without applying surface pressure to the membrane electrode assembly by tightening using bolts or the like.

Although the above description is focused on the cathode side, the same applies to the anode electrode side.

The length of the carbon nanotubes 31 is 10 μm or shorter, and preferably 1 to 3 μm and it is preferable that the length of the carbon nanotubes 35 be 200 μm or longer, and further preferable that the length be 200 to 500 μm. These are the lengths in the longitudinal (tubular axis) direction of the carbon nanotubes, and if the length is less than 200 μm the supply and diffusion of hydrogen (fuel) and air (oxidant gas) decreases, leading to a possible decrease in electrical generation efficiency.

Both the carbon nanotubes 31 and the carbon nanotubes 35 can be fabricated by a known synthesis method, such as the electric arc discharge method or laser deposition method, the CVD method, in which a catalyst metal for the purpose of generating the carbon nanotubes (hereinafter "CNT production catalyst metal") is used, this CNT production catalyst metal being supplied with a hydrocarbon gas or a hydrogen gas to perform synthesis, or the HiPco method, in which an asymmetrical reaction of carbon monoxide ($CO+CO \rightarrow C+CO_2$) is caused to occur to achieve synthesis under conditions of high temperature and pressure (refer to, for example, P. Nikolaev, M. J. Bronikowski, R. K. Bradley, F. Rohmund, D. T. Colbert, K. A. Smith, R. E. Smalley, Chem. Phys. Letters 313 (1999), pp. 91-97).

An example of a method of fabricating carbon nanotubes for the case of synthesizing single-layer carbon nanotubes using a catalyst carrier is described below.

Fabrication is possible in a vacuum by supplying a material gas to the catalyst carrier that has been heated to at least a prescribed temperature while carrying Iron (Fe), which is the CNT production catalyst metal, of a prescribed thickness (for example, 4 nm), this being the carbon nanotube production step. In addition to this carbon nanotube production step, other steps such as a catalyst carrying step, a base washing step, and a post-processing step or the like can be provided as needed.

In the carbon nanotube production step, the catalyst carrier is placed in a vacuum chamber and heated to a prescribed temperature that is suitable for the production of carbon nanotubes, a material gas (carbohydrate gas, alcohol gas, or hydrogen gas or the like) being supplied to the catalyst carrier. In performing this gas supply, it is possible to control the tube diameter by, for example, by adjusting the flow amount of the material gas or the reaction temperature, or adjusting the amount of dwell time, by changing the size (particle diameter) of the CNT production catalyst metal), or by further heating the produced carbon nanotubes to the temperature range from 1500 to 1800° C. It is also possible to ionize the material gas using, for example, an ion gun or the like, so as to control the material gas condition in accordance with the shape, such as the layer structure, diameter, or length or the like, or the orientation of the carbon nanotubes that are to be produced.

It is desirable that the flow rate of the material gas at the surface of the catalyst carrier when the material gas is supplied be 2 mm/s or greater. If this flow rate is exceeded, it is possible to efficiently produce carbon nanotubes having a diameter of 200 μm or greater.

It is desirable that the prescribed temperature of the catalyst carrier when the material gas is supplied be 400° C. or higher. If the prescribed temperature is within this range, it is possible to achieve production speed, and possible to stably produce carbon nanotubes with uniformity of diameter, length, and orientation. It is particularly preferable that the temperature be 500° C. to 1000° C., and within this range it is possible to produce uniform carbon nanotubes with further improved efficiency. It is desirable that the vacuum condition in this step generally be $10^{-3}$ to 10 Pa.

The material gas includes a hydrocarbon-based gas or alcohol-based gas (CH-based gas) and a hydrogen-based gas (H-based gas). Specifically, it is possible to use at least one type selected from hydrocarbon-based gas and alcohol-based gas, or both one type selected from hydrocarbon-based gas and alcohol-based gas and one type selected from hydrocarbon-based gas and hydrogen-based gas (or in some cases gasification). Suitable hydrocarbon components of the hydrocarbon-based gas are hydrocarbons having 1 to 6 carbon atoms (for example, methane, ethane, acetylene, benzene, and the like). Suitable alcohol-based gases are such gases as methanol, ethanol, and the like. Suitable hydrogen-based gases are, for example, hydrogen gas and ammonia gas and the like. In the case in which the CH-based or H-based material is in liquid phase or solid phase, it is possible to supply it after gasification. Also, in the case of a mixture of CH-based gas and H-based gas, it is preferable that the mixture ratio (CH-based:H-based) be in the range 1:1 to 1:20 partial pressure ratio or flow amount ratio).

The catalyst carrier is configured so as to carry the CNT production catalyst metal on the surface of a base. In addition to Fe, it is possible to use Pd, Co, Ni, W, Mo, Mn, or an alloy thereof as the CNT production catalyst metal. It is possible to use Al, Ni, stainless steel, Si, SiC, zeolite, activated carbon (C) or the like as the base, configured as in an arbitrary shape, and preferably configured so as to be planar.

In the production of carbon nanotubes, it is possible to further provide a base washing step and a catalyst carrying step as steps before the carbon nanotube production step, and it is possible to further provide a post-processing step or the like as a step after the carbon nanotube production step.

In the base washing step, the surface of the base that is used (substrate or the like) is washed. For example, the substrate that is the base can be washed by heat treating it in an electrical oven that has been evacuated. Also, in the catalyst carrying step the CNT production catalyst metal is supported by the base so as to make the catalyst carrier used in producing the carbon nanotubes. There is no particular restriction with regard to the specific method used. For example, a CNT production catalyst metal such as Fe or the like can be uniformly vapor-deposited as particles on a desired base, so as to produce the catalyst carrier.

Also, in the post-processing step, it is possible to post-process the carbon nanotubes produced in the carbon nanotube production step or the catalyst carriers produced from the carbon nanotubes. Specifically, the following steps are performed. For example, the produced carbon nanotubes are re-heated up to 1500 to 1850° C. so as to adjust the tube diameter as needed. It is also possible to heat the carbon nanotubes in air to 500 to 600° C. (air oxidation processing), or to perform acid treating using hydrochloric acid or aqua regia or the like, and to form apertures at the tube ends when re-heating as in the former case; and to perform cap-opening processing by cutting the tube ends, removal of the CNT production catalyst metal after the production of carbon nanotubes, or removal of amorphous carbon, such as soot, that has become attached to the carbon nanotubes in the later case of acid treating.

Also, the carrying of Pt (electrode catalyst metal) on the surface of the carbon nanotubes 31 (and, in some cases, the carbon nanotubes 35) can be performed by dilute alcohol solution of a chloroplatinate or platinum nitric acid solution the details of which are described later.

The diffusion layers 16, 17 are formed from woven carbon cloth of threads made from a carbon fiber. In addition to carbon cloth, the diffusion layers can be made from carbon paper or carbon felt or the like, which is made of carbon fibers.

A plurality of grooves (ribs) is formed in the separators 21, 22 to form the hydrogen gas flow passage 23 and the air flow passage 24, respectively. The hydrogen gas flow passage 23 is formed between the anode-side separator 21 and the side of the diffusion layer 16 opposite the side of the diffusion layer 16 on which the carbon nanotubes 35 are oriented. The air flow passage 24 is formed between the cathode-side separator 22 and the side of the diffusion layer 17 opposite the side of the diffusion layer 17 on which the carbon nanotubes 25 are oriented (refer to FIG. 1). The separators may be made of an electrically conductive material that is not gas-permeable, for example, from a dense carbon that has been made non-permeable to gas by compression.

Although in the case of a single cell the separators 21, 22 have a flow passage on only one side surface, in the case of a stack structure in which a plurality of single cells are laminated, one separator is shared between two membrane electrode assemblies, and a flow passage is formed on the surfaces on both sides of the separator. That is, there is a convex rib is formed on the surfaces on both sides of one separator, a hydrogen flow passage 23 being formed in the anode electrode being formed on one side, and an air flow passage being formed on the cathode electrode of the neighboring membrane electrode assembly on other side.

Next, an example of the method of manufacturing the membrane electrode assembly 20 will be described. The membrane electrode assembly 20 can be manufactured by performing the following steps. An electrode catalyst carrying step of Pt (electrode catalyst metal) 32 being supported on carbon nanotubes 31 produced on the catalyst carrier that carries the CNT production catalyst metal on the base is performed. A transfer step of transferring the carbon nanotubes 31 on which the Pt 32 is carried to the fluorine-based ion exchange resin membrane 11 (polymer electrolyte membrane) to join one end of the carbon nanotubes 31 to the fluorine-based ion exchange resin membrane 11 and to orient same substantially perpendicular to the membrane surface is performed, and a disposing step of causing the fluorine-based ion exchange resin membrane 11 and the diffusion layer 17 to make contact (preferably by intertwining) with the carbon nanotubes 31 and carbon nanotubes 35 that are oriented substantially perpendicularly with the layer surface of die diffusion layer 17 so that they overlap is performed. In this method of manufacturing a membrane electrode assembly 20 an application step of forming a Nafion layer 33 and a PTFE layer 34 on the carbon nanotubes 31 that carry the Pt 32 may be provided between the electrode catalyst carrying step and the transfer step.

In the electrode catalyst carrying step, Pt (electrode catalyst metal) is carried by the carbon nanotubes 31 that are to be produced as the catalyst carriers. The carrying of Pt on the carbon nanotubes 31 may be performed by either a wet method or a dry method. In the case of the wet method, a method may be applied in which a solution obtained by dissolving an appropriate amount of a platinum chemical such as a chloroplatinate or a platinum nitric acid solution into in an alcohol such as ethanol is applied to the carbon nanotubes 31, and then the carbon nanotubes 31 are heated to at least 150° C. in a hydrogen atmosphere. The application of the solution may be performed, for example, by immersing the carbon nanotubes 31 into the solution, or by dripping or spraying the solution onto the carbon nanotubes 31. In the case of the dry method, a method of electron beam deposition, a method of sputtering, or a method of electrostatic painting or the like may be used.

Also, before the electrode catalyst carrying step, another step such as an already-described carbon nanotube production step, a catalyst carrying or base washing step, or a post-processing step may be provided. These steps are as already described.

In the transfer step, the carbon nanotubes 31 that carry the Pt are transferred to the fluorine-based ion exchange resin membrane 11. The transfer of the carbon nanotubes can be accomplished by disposing the carbon nanotubes 31 in the same orientation condition as when produced by the catalyst carrier so that an end part of the side that does not contact the catalyst carrier makes contact with the fluorine-based ion exchange resin membrane 11, and performing heating and pressure application to form an assembly, from which the catalyst carrier is removed by the peeling method.

The heating and pressure application processing of this step can be performed, for example, by the hot press method or the like, using a pair of hot plates or the like to which pressure can be applied. The heating temperature in this case is 110 to 130° C., and the applied pressure is 1 to 2 MPa, these being selected from the standpoint joining with the fluorine-based ion exchange resin membrane 11.

By removing and transferring the catalyst carrier by a peeling method, the carbon nanotubes 31 are oriented on the fluorine-based ion exchange resin membrane 11 substantially maintain the orientation at the time of production thereof. For this reason, when the carbon nanotubes produced in the carbon nanotube production step are produced linearly and substantially perpendicular to the carrying surface of the catalyst carrier, it is possible to provide linear carbon nanotubes substantially perpendicular to the fluorine-based ion exchange resin membrane 11 by transferring these. Art for substantially perpendicular orienting can be the application of a method of causing substantially perpendicular orientation by transferring carbon nanotubes synthesized on a base to a thermally plastic material or the like.

In the disposing step, the fluorine-based ion exchange resin membrane 11 and the diffusion layer 17 entering between and preferably intertwining with the CNTs the carbon nanotubes 35 on the other side that are oriented substantially perpendicularly to the surface of the carbon nanotubes 31 and diffusion layer 17, so as to manufacture a membrane electrode assembly. The carbon nanotubes 35 that are oriented to the diffusion layer can be formed directly on the diffusion layer by using a known synthesis method.

Between the above-noted electrode catalyst carrying step and transfer step, an application step of applying a Nafion solution (proton-conductive substance) to the carbon nanotubes 31 that carry the Pt (electrode catalyst metal) so as to form a Nafion layer 33 having a thickness of 10 nm. In this case, the carbon nanotubes 31 are transferred in the condition in which the Pt 32 and Nafion layer 33 are provided.

When providing the application step as in this embodiment, along with forming the Nafion layer 33, a further layer of polytetrafluoroethylene (PTFE; water repellent) is applied onto the Nafion layer 33 that is formed, so as to form a PTFE layer 34. In this case, the carbon nanotubes 31 are transferred in the subsequent transferring step in the condition in which the Nafion layer 33 and PTFE layer 34, along with the Pt 32, are provided.

The formation of the Nafion layer 33 and the PTFE layer 34 in the application step can be done using a known method, such as a painting method or an immersion method or the like, using Nafion solution (proton-conductive substance solution) or PTFE solution (water-repellent material solution), and the immersion method is particularly desirable from the standpoint of uniformly applying to the surface of each and every fine carbon nanotube.

Although the foregoing description is for the case in which the carbon nanotubes 31, 35 are configured linearly and in which each carbon nanotube are oriented substantially perpendicularly to the membrane surface and layer surface, respectively, another preferable embodiment is one in which the carbon nanotubes 31, 35 are provided in a non-linear form, such as in a helical form, so that the carbon nanotubes 31, 35 mutually intertwine. The carbon nanotubes are not restricted to being in a single layer, and the same applies to the case in which multilayer carbon nanotubes are provided as two or more layers.

Although in the above-described embodiments the description was focused on the case of a solid polymer fuel cell (PEFC) using hydrogen and air as fuel, the same applies also to the case of a direct methanol fuel cell (DMFC) using a methanol solution.

Also, the membrane electrode assembly and fuel cell according to the present invention can be applied as an electrical power source for an electrical vehicle such as an electrical automobile, for a ship, and for an airplane and the like.

What is claimed is:

1. A membrane electrode assembly comprising:
   a polymer electrolyte membrane in which a plurality of first electrically conductive fibers is oriented; and
   a diffusion layer in which a plurality of second electrically conductive fibers is oriented, and in which the plurality of the second electrically conductive fibers are disposed in contact with the plurality of the first electrically conductive fibers,
   wherein only the plurality of the first electrically conductive fibers supports an electrode catalyst metal.

2. The membrane electrode assembly according to claim 1, wherein:
   the plurality of the first electrically conductive fibers are oriented so as to be substantially perpendicular to a surface of the polymer electrolyte membrane; and
   the plurality of the second electrically conductive fibers is oriented so as to be substantially perpendicular with respect to a surface of the diffusion layer.

3. The membrane electrode assembly according to claim 1, wherein the plurality of the first electrically conductive fibers and the plurality of the second electrically conductive fibers are carbon nanotubes.

4. The membrane electrode assembly according to claim 1, wherein the electrode catalyst metal is platinum or an alloy of platinum with another metal.

5. The membrane electrode assembly according to claim 1, wherein a particle diameter of the electrode catalyst metal is smaller than or equal to an outer diameter of the electrically conductive fibers.

6. The membrane electrode assembly according to claim 1, wherein a layer of proton-conductive substance is provided on the surface of the electrically conductive fibers.

7. The membrane electrode assembly according to claim 6, wherein the proton-conductive substance is selected from the group consisting of a Nafion solvent and a perfluorosulfonate-based chemical compound.

8. The membrane electrode assembly according to claim 6, wherein a thickness of the layer of the proton-conductive substance is in a range from 10 nm to 100 nm.

9. The membrane electrode assembly according to claim 6, wherein a layer of water repellent is provided on the layer of the proton-conductive substance.

10. The membrane electrode assembly according to claim 9, wherein the water repellent is a fluoride-based resin.

11. The membrane electrode assembly according to claim 10, wherein the water repellent is at least one selected from the group consisting of polytetrafluoroethylene and vinylidene polyfluoride.

12. The membrane electrode assembly according to claim 1, wherein a length in the longitudinal direction of the plurality of the first electrically conductive fibers is in a range from 1 μm to 10 μm.

13. The membrane electrode assembly according to claim 1, wherein a length in the longitudinal direction of the plurality of the second electrically conductive fibers is in a range from 200 μm to 500 μm.

14. The membrane electrode assembly according to claim 1, wherein the diffusion layer is comprised of at least one material selected from the group consisting of carbon cloth, carbon paper, and carbon felt that are made of carbon fibers.

15. The membrane electrode assembly according to claim 1, wherein the plurality of first electrically conductive fibers and the plurality of second electrically conductive fibers are arranged such that at least one electrically conductive fiber of the plurality of the first electrically conductive fibers is interposed, in contact, between two electrically conductive fibers of the plurality of the second electrically conductive fibers.

16. A fuel cell comprising:
   a polymer electrolyte membrane in which a plurality of first electrically conductive fibers is oriented;
   a diffusion layer in which a plurality of second electrically conductive fibers is oriented, wherein the plurality of the second electrically conductive fibers are disposed in contact with the plurality of the first electrically conductive fibers; and
   a separator that provides a flow passage formed by a convex groove, between the separator and a non-oriented region of the plurality of the second electrically conductive fibers of the diffusion layer,
   wherein only the plurality of the first electrically conductive fibers supports an electrode catalyst metal.

17. The fuel cell according to claim 16, wherein fuel gas or oxidant gas flows through the flow passage.

* * * * *